United States Patent [19]

Bennett

[11] 4,165,862
[45] Aug. 28, 1979

[54] LEVELING DEVICE FOR CAMPER TRAILERS AND LIKE VEHICLES

[76] Inventor: Stephen A. Bennett, 216 E. Jefferson, Havana, Ill. 62644

[21] Appl. No.: 931,873

[22] Filed: Aug. 8, 1978

[51] Int. Cl.² .............................................. E02C 3/00
[52] U.S. Cl. ...................................................... 254/88
[58] Field of Search ........................... 254/88; 248/352

[56] References Cited

U.S. PATENT DOCUMENTS

| | | | |
|---|---|---|---|
| 576,825 | 2/1897 | Roemheld | 254/88 |
| 1,493,475 | 5/1924 | Cook | 254/88 |
| 1,922,551 | 8/1933 | McCosh | 254/88 |
| 2,184,061 | 12/1939 | Skroback | 254/88 |
| 2,675,210 | 4/1954 | Lowber | 254/88 |
| 3,752,441 | 8/1973 | Rogers | 254/88 |

*Primary Examiner*—Robert C. Watson
*Attorney, Agent, or Firm*—Scrivener, Parker, Scrivener and Clarke

[57] ABSTRACT

An assembly of vertically stacked slabs is provided, any number of which are adapted to be placed beneath the low wheel of a camper trailer or other vehicle to level the vehicle. The slabs are separably connected to provide a portable unitary kit, and at one end of the kit each slab is tapered from its upper to its bottom surface, and the tapered surfaces of all of the slabs form an inclined ramp.

3 Claims, 4 Drawing Figures

LEVELING DEVICE FOR CAMPER TRAILERS AND LIKE VEHICLES

BACKGROUND OF THE INVENTION

The prior art relevant to the invention is found in devices for leveling vehicles of all kinds, devices for building up furniture and furniture legs, devices for supporting one or both legs of a ladder, and the like. A statement setting forth the most pertinent prior art known to applicant and his attorney is filed herewith.

DESCRIPTION OF THE INVENTION

Figure 1:
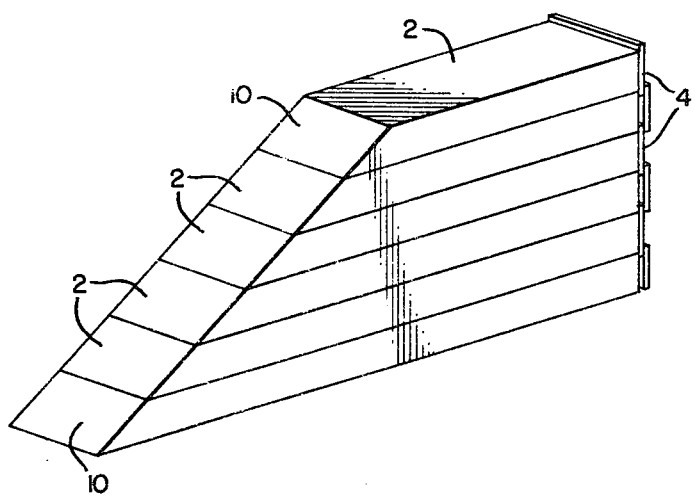
FIG. 1 is a perspective view of the leveling kit or assembly provided by the invention.

The leveling kit provided by this invention is generally disclosed in FIG. 1, and comprises a plurality of flat slab-like pieces 2 of wood, metal, synthetic plastic or other suitable strong and rigid material. These slabs are superposed, one on top of the other, forming a rigid pile with the upper and lower surfaces of each slab in fact-to-face contact with the slab above or below it. Any number of slabs can be used to form the assembly, six being provided in the preferred embodiment of the invention and being disclosed for purposes of illustration.

The slabs are preferably uniform in width, and as they are to be used to support the wheel of a vehicle the width of each should be at least that of a conventional automobile tire. One end of each slab is cut off at right angles to the length of the slab to form a square end 4, and these ends are substantially vertically aligned as shown in the drawings.

Means are provided by the invention for facilitating the placing of the wheel of an automobile on the upper surface of a stack of any number of the slabs. In accordance with this feature of the invention the end of each slab opposite its squared end 4 is tapered to wedge shape by forming on it an inclined surface 10 extending from the lower to the upper surface of the slab and inclined from the lower surface toward the squared end 4. The surfaces 10 of the entire assembly of slabs, or of any number of them, are so formed that each surface forms a continuation of the others, whereby all of the inclined surfaces 10 cooperate to form an inclined ramp extending from the lower surface of the bottom slab to the upper surface of the top slab, regardless of the number of slabs used. The angle of inclination of each surface 10, and therefore the angle of inclination of the entire ramp, is such that the wheel of a vehicle may readily be pushed or driven up the ramp, and in practice I have found that an angle of 35° to the horizontal provides good results.

Figure 2:
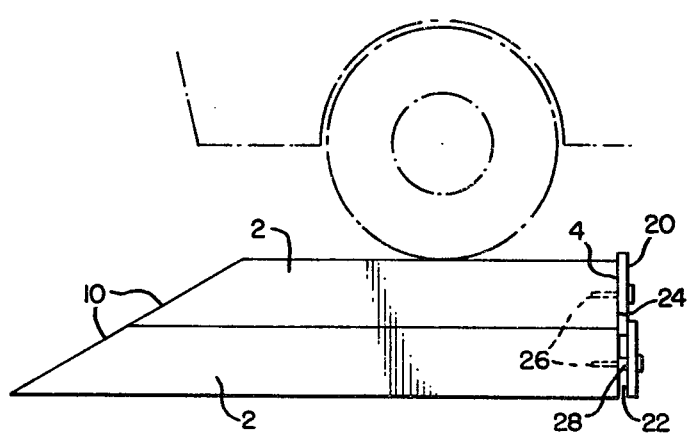
FIG. 2 is a side elevational view of a slab assembly according to the invention, showing a preferred means for releasably connecting the slabs together.

Any number of the slabs of the whole assembly may be used beneath a wheel of a vehicle to effect leveling, the number being dependent on the distance the wheel must be raised. In order to permit the slabs to be carried as a unitary kit, and to permit any number of them to be removed from the kit to effect a desired leveling, means are provided by the invention which connect the slabs into a unitary kit but permit easy and quick separation of any number of them from the kit, either singly or as a group. A preferred form of such means is disclosed in FIGS. 1 and 2 and comprises a plurality of rigid flat plates 20 each of which is connected to the squared end 4 of one of the slabs and each of which is larger in vertical dimension than the thickness of the slab. These plates are of uniform thickness and the plates of alternate slabs are spaced from the squared end of the slab by a distance equal to the plate thickness, as shown at 22, and are connected in fact-to-face engagement with the squared end as shown at 24. Bolts, screws or other suitable means 26 are provided for connecting each plate to its associated slab, and a spacer 28 is provided for each plate which is spaced from its associated slab. It will be seen from an inspection of FIG. 2 that when two or more slabs are in superposed relation the upper and lower edges of plate 20 of one slab will be received within the spaces 22 of the adjacent slabs. The edges of the plates are received within the spaces 22 with a light friction fit and the slabs will therefore be held together in assembled kit form but one or any number may easily be separated from the others.

Figure 3:
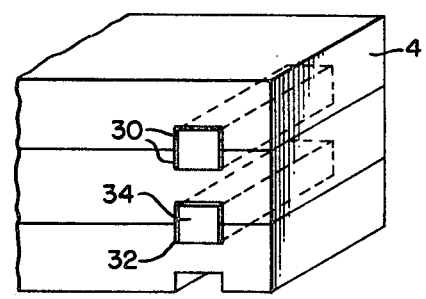
FIGS. 3 and 4 are perspective views showing alternative means for connecting the slabs together.

In FIG. 3 of the drawings there is illustrated an alternative means for releasably connecting two or more of the slabs together. In this embodiment the upper and lower surface of each slab adjacent the squared end 4 thereof is formed with a channel 30 extending transversely of the slab, all of the channels being spaced the same distance from the squared end, and it will be seen that when two or more slabs are superposed the upper and lower channels 30 will form a transverse opening 32 in two adjacent slabs. Bars or rods 34 are provided and each has a cross sectional size and shape which permits it to be received with a light friction fit in the transverse combined passage 32 thereby releasably connecting adjacent slabs.

Figure 4:
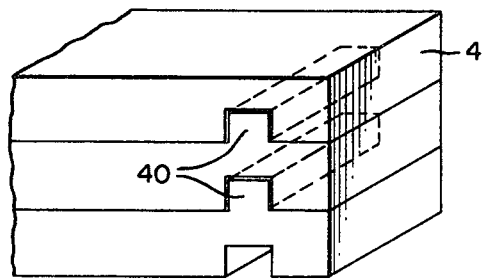

A second alternative means for releasably connecting the slabs is disclosed in FIG. 4. Each slab is provided with an upwardly extending transverse ridge 40 which extends across the upper surface of the slab adjacent the squared end 4 thereof. Each slab is also provided in its lower surface with a passage 42 which extends transversely of the slab and upwardly form the lower surface thereof and which is of such a cross-sectional size and shape that the ridge 40 of each slab is received with a light friction fit within the transverse passage in the adjacent upper slab.

In the intended use of the invention, it being assumed that one wheel of a camper trailer or other vehicle is lodged in a depression and it is desired to raise it in order to level the vehicle, an estimate of the distance necessary to raise the wheel is made and the appropriate number of slabs are removed from the top or bottom of the assembly. These selected slabs, in superposed assembled relation are placed as an assembly adjacent and in alignment with the depressed wheel, and the vehicle is moved up the ramp at one end of the assembly to the top of the pile of slabs which have been so placed, thus leveling the vehicle.

I claim:

1. A leveling device for raising the wheel of a vehicle such as a camper trailer to a desired level, comprising a kit having a plurality of elongaged separate flat slabs arranged in superposed abutting relation to form a stack, at least one end of each slab being tapered from the lower surface to the upper surface in the direction of the length of the slab, the tapered ends being at the same end of the stack with the lower edge of each tapered end being at the upper edge of the tapered end of the slab next beneath it, thereby forming a continuous inclined ramp from the lower surface of the lowermost slab to the upper surface of the uppermost slab, and cooperating means on adjacent slabs for frictionally and separately connecting adjacent slabs, said means comprising a flat plate connected to the un-tapered end of each slab the vertical dimension of which is greater than that of the connected slab, the plates of adjacent slabs being alternatively:

a. connected in spaced relation to the adjacent end of the slab by a space approximately equal to the thickness of the plate, and
b. connected in face-to-face abutting relation to the adjacent end of the slab.

2. A leveling device for raising the wheel of a vehicle such as a camper trailer to a desired level, comprising a kit having a plurality of elongaged separate flat slabs arranged in superposed abutting relation to form a stack, at least one end of each slab being tapered from the lower surface to the upper surface in the direction of the length of the slab, the tapered ends being at the same end of the stack with the lower edge of each tapered end being at the upper edge of the tapered end of the slab next beneath it, thereby forming a continuous inclined ramp from the lower surface of the lowermost slab to the upper surface of the uppermost slab, in which each slab has formed therein adjacent the un-tapered end of the slab a transversely extending passage opening to the lower surface of the slab, and each slab has formed therein a transversely extending opening to the upper surface of the slab, the passages being in vertical registry whereby each pair forms a combined passage extending transversely of the slab, and a bar disposed within each combined passage and having a light friction fit therein to thereby separably connect adjacent slabs.

3. A leveling device for raising the wheel of a vehicle such as a camper trailer to a desired level, comprising a kit having a plurality of elongated separate flat slabs arranged in superposed abutting relation to form a stack, at least one end of each slab being tapered from the lower surface to the upper surface in the direction of the length of the slab, the tapered ends being at the same end of the stack with the lower edge of each tapered end being at the upper edge of the tapered end of the slab next beneath it, thereby forming a continuous inclined ramp from the lower surface of the lowermost slab to the upper surface of the uppermost slab, in which each slab has a passage formed in the lower surface thereof adjacent its un-tapered end and extending from side to side thereof, and each slab has formed on the upper surface thereof adjacent its un-tapered end a ridge extending from side to side of the slab and being of such cross sectional size and shape that it is received with a light friction fit in the transverse passage in the adjacent upper slab.

* * * * *